(12) United States Patent
Albrecht

(10) Patent No.: US 10,128,719 B2
(45) Date of Patent: Nov. 13, 2018

(54) TORQUE SUPPORT

(71) Applicant: B&R INDUSTRIAL AUTOMATION GMBH, Eggelsberg (AT)

(72) Inventor: Manfred Albrecht, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 51 days.

(21) Appl. No.: 14/564,528

(22) Filed: Dec. 9, 2014

(65) Prior Publication Data

US 2015/0171695 A1 Jun. 18, 2015

(30) Foreign Application Priority Data

Dec. 16, 2013 (AT) .............................. A 50833/2013

(51) Int. Cl.
*H02K 5/00* (2006.01)
*H02K 5/24* (2006.01)

(52) U.S. Cl.
CPC ................. *H02K 5/00* (2013.01); *H02K 5/24* (2013.01)

(58) Field of Classification Search
CPC .............. H02K 5/00; H02K 5/24; D21F 7/02
USPC ................ 310/51, 89, 90, 91; 248/607, 671; 74/411
See application file for complete search history.

(56) References Cited

U.S. PATENT DOCUMENTS

| 3,400,603 | A | * | 9/1968 | Stafford | .................... | C21C 5/50 74/411 |
| 4,482,337 | A | * | 11/1984 | Petrzelka | ............. | F16C 21/005 464/128 |
| 6,067,876 | A | * | 5/2000 | Lohaus | ................. | F16F 15/145 74/574.4 |
| 6,247,383 | B1 | * | 6/2001 | Chun | ...................... | F16H 35/06 248/659 |
| 2007/0063605 | A1 | * | 3/2007 | Kato | ..................... | F16D 1/0858 310/91 |

FOREIGN PATENT DOCUMENTS

| DE | 79 20 630 | 10/1979 |
| DE | 10 2011 011 853 | 8/2012 |
| EP | 0 924 338 | 6/1999 |
| EP | 0924338 | * 6/1999 |
| EP | 1 762 772 | 3/2007 |

(Continued)

OTHER PUBLICATIONS

English translation of EP 0924338; Jun. 1999; Heinz et al.*

(Continued)

*Primary Examiner* — Bernard Rojas
*Assistant Examiner* — Ahmed Elnakib
(74) *Attorney, Agent, or Firm* — Greenblum & bernstein, P.L.C.

(57) ABSTRACT

To permit a torque support (4) having the most play-free introduction of force into the supporting structure with a compensation of tolerance at the same time, it is provided that a guide bushing (24), which is arranged in a recess (28) on the second end (13) and a connecting pin (20), which is pivotably mounted in the guide bushing (24) all arranged on a connecting part (10) of the torque support (4), a gap (29) being provided in the radial direction (R) between the guide bushing (24) and the recess (28) and the guide bushing (24) being arranged in a play-free manner in the tangential direction (T) in the recess (28).

4 Claims, 2 Drawing Sheets

(56) References Cited

FOREIGN PATENT DOCUMENTS

EP      2 371 600      10/2011
ES        2036913       6/1993

OTHER PUBLICATIONS

English translation of DE 102011011853; Aug. 2012; Holger et al.*
Austria Search Report conducted in counterpart Austrian Appln. No. A 50833/2013 (dated Jun. 25, 2014).

* cited by examiner

TORQUE SUPPORT

CROSS-REFERENCE TO RELATED APPLICATIONS

The present application claims priority under 35 U.S.C. § 119(a) of Austrian Patent Application No. A50833/2013 filed Dec. 16, 2013, the disclosure of which is expressly incorporated by reference herein in its entirety.

BACKGROUND OF THE INVENTION

1. Field of the Invention

The present invention relates to a torque support and a drive unit having such a torque support.

2. Discussion of Background Information

When an electric motor is mounted only on a shaft of the component to be driven without being connected to this component in a torque-proof manner by means of a connecting flange, for example, then the resulting reactive torque of the electric motor must be supported in some way in order to prevent the electric motor itself from rotating about its own axis. So-called torque supports are used for this purpose. The electric motor is connected by means of such torque support to a stationary component to absorb the reactive torque.

DE 10 2011 011 853 A1 describes a torque support having a spherical bearing arrangement with which the torque support can be uncoupled in terms of vibrations from an automotive frame. To this end, a spring element acting in all directions is provided as damping in the spherical bearing arrangement. In addition, the spherical bearing arrangement also permits a compensation of tolerance through the flexible spring element with which a radial offset can be compensated by a lateral tilt angle.

Tolerance compensation on the torque support is necessary and desirable per se to compensate for any alignment errors in the drive shaft with respect to the supporting structure or for thermal expansion. However, a spring element for vibration decoupling is not desirable in a normal torque support for a drive unit because it is desirable in a drive unit that the forces are introduced into the supporting structure in a tolerance-free manner as possible. Such a spring element in the torque support as that described in DE 10 2011 011 853 A1 would be counterproductive in this regard.

SUMMARY OF THE EMBODIMENTS

Embodiments of the present invention is therefore to provide a torque support, which will allow the introduction of forces into the supporting structure as tolerance-free as possible and which nevertheless allows an adequate compensation of tolerance.

According to embodiments of the invention, a guide bushing is arranged in a recess on the second end and a connecting pin is pivotably mounted in the guide bushing as part of a connecting part. A gap is provided in the radial direction between the guide bushing and the recess and the guide bushing is arranged in the tangential direction (in a play-free arrangement) in the recess. The resulting reactive torque and/or the resulting reacting force can be introduced in this way into a supporting structure in the tangential direction without any play. In this way, a further compensation of tolerance is possible in the radial direction. A certain angle offset can also be compensated through the pivotable bearing of the connecting pin in the guide bushing.

It is thus possible to ensure both the required compensation of tolerance and the play-free introduction of forces.

The pivotable bearing of the connecting pin in the guide bushing is advantageously implemented with an spherical bearing wherein the outside part of the spherical bearing is supported in the guide bushing and the connecting pin is arranged on the interior part of the spherical bearing. Such spherical bearings are standard components that can be used easily and inexpensively.

The connecting pin is clamped axially to the interior part of the spherical bearing by means of a pin retention part with a simple design in order to hold the connecting pin in the spherical bearing.

The guide bushing is clamped axially with the outside part of the spherical bearing and with the torque support by means of a bearing retention part in a structurally simple manner, so it is possible to hold the spherical bearing in the guide bushing and also to hold the guide bushing in the recess in the torque support.

To be able to dampen unwanted vibrations of the torque support without having a negative effect on the play-free introduction of force, a damping element is preferably arranged axially between the torque support and the bearing retention part or the guide bushing.

Other exemplary embodiments and advantages of the present invention may be ascertained by reviewing the present disclosure and the accompanying drawing.

BRIEF DESCRIPTION OF THE DRAWINGS

The present invention is explained in greater detail below with reference to FIGS. 1 through 4, which illustrate schematically advantageous examples of nonrestrictive embodiments of the invention, in which.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
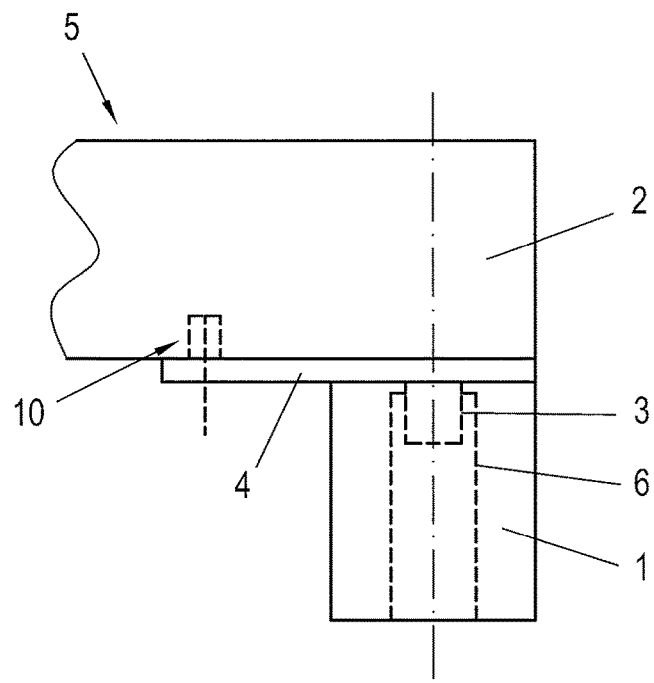
FIG. 1 shows a drive unit having an electric motor with torque support and driven part.

FIG. 1 shows a drive unit having an electric motor 1 and a driven part 2, which can be driven by the electric motor 1. The electric motor 1 is therefore put on the drive shaft 3 of the driven part 2 and is connected to the drive shaft 3 by a clamping element on a stationary component 5 or by a central screw through the engine shaft 6. However, this connection is not with a torque-proof, i.e., the connection cannot transfer the resulting reactive torques entirely or not completely. To prevent the electric motor 1 from rotating about its own axis due to the resulting reactive torques, a torque support 4 is provided, that is attached to the electric motor 1 at one end and to the stationary component 5, for example, the housing of the drive part 2 or a stationary supporting structure for the drive part 2, at the other end.

Figure 2:
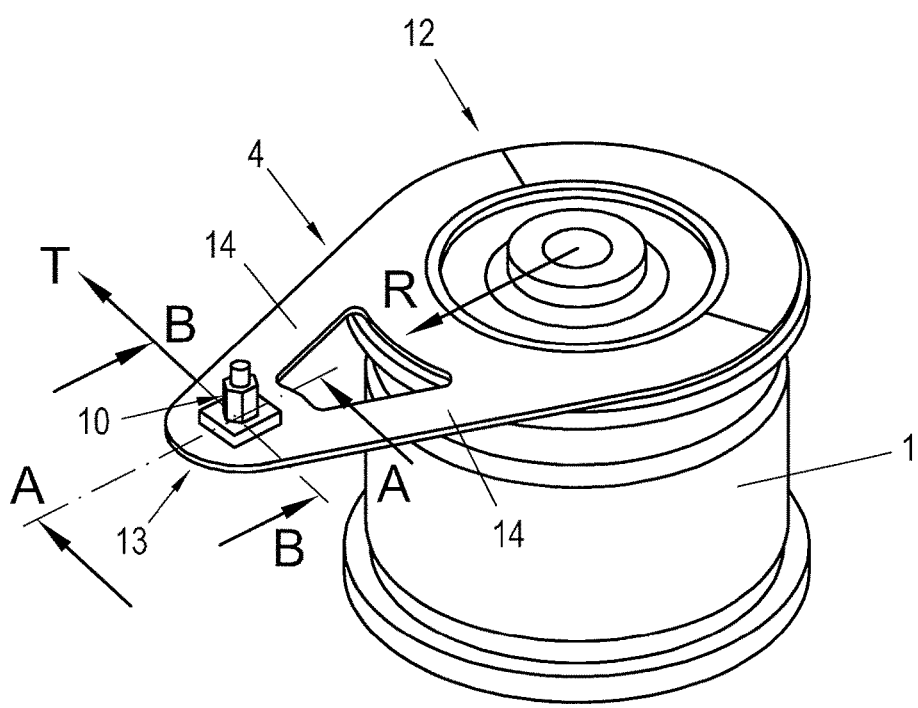
FIG. 2 shows a perspective diagram of an electric motor having torque support.

FIG. 2 shows the electric motor 1 with the torque support 4. The torque support 4 is connected to the electric motor 1 at a first end 12 in a rotationally fixed manner, for example by screws (not shown). A connecting part 10 is arranged at the second end 13 of the torque support 4, the torque support 4 being thereby connected to the stationary component 5. The first end 12 and the second end 13 of the torque support 4 are connected to one another by a rigid connecting strut 14. In the exemplary embodiment shown here, the torque support 4 is designed in a V-shape with two connecting struts 14.

Figure 3:
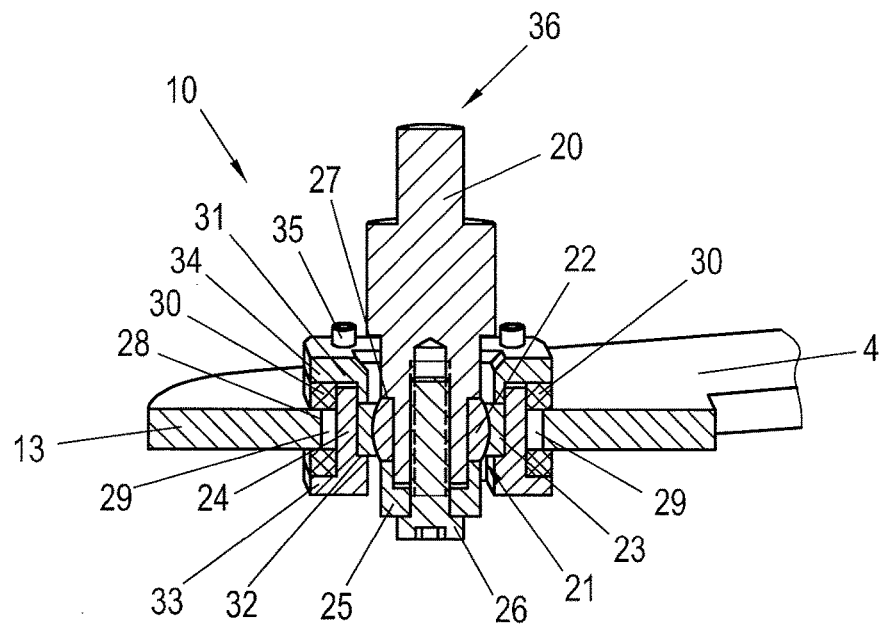
FIG. 3 shows a section through the torque support in a radial direction and FIG. 4 shows a section through the torque support in a tangential direction.
Figure 4:
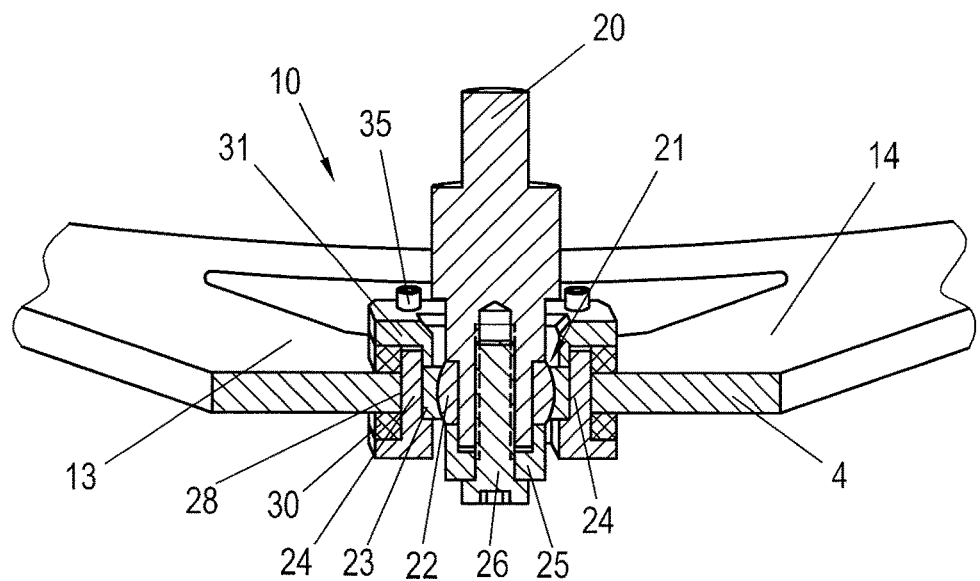

To be able to introduce the resulting force (from the torque of the electric motor 1 and the length between the axis of rotation of the electric motor 1 and the axis of the connecting part 10) in the direction of force without any play into the stationary component 5, a connecting part 10, by which the torque support 4 connected to the stationary component 5, is arranged on the second end 13 of the torque support 4 facing away from the electric motor 1. This connecting part 10 is explained below with reference to FIGS. 3 and 4, which show various sections through the connecting part 10. FIG. 3 shows a section A-A in the radial direction R and FIG. 4 shows a section B-B in a tangential direction T through the connecting part 10, wherein the directions radially and tangentially refer to the engine shaft 6 and/or the drive shaft 3.

The connecting part 10 comprises a guide bushing 24 in which a connecting pin 20 is arranged so that it is pivotably mounted in relation to its longitudinal axis, preferably being pivotable in all directions. In the exemplary embodiment shown here, an spherical bearing 21 is arranged in the guide bushing 24, wherein the connecting pin 20 is arranged on the interior part 22 of the spherical bearing 21 and is connected thereto. The respective exterior part 23 of the spherical bearing 21 is arranged in the guide bushing 24. The guide bushing 24 is fastened in a recess 28 in the torque support 4, here in its second end 13. The spherical bearing 21 may be a maintenance-free bearing or a lubricated bearing.

Instead of a spherical bearing 21 however any other design may also be selected that allows only pivoting of the connecting pin 20.

The free end 36 of the connecting pin 20 is inserted into a recess in the stationary component 5 in assembly of the torque support 4 in a drive unit, as indicated in FIG. 1. It is self-evident that the free end 36 of the connecting pin 20 is arranged in the stationary component 5 without any play.

To fasten the connecting pin 20 to the interior part 22, the connecting pin 20 is inserted here into the interior part 22 and is clamped to the interior part 22 by a pin retaining part 25, that axially abuts the interior part 22 and the connecting pin 20, and of a screw 26 in the connecting pin 20. The connecting pin 20 therefore has a corresponding shoulder 27 with which the interior part 22 is in contact axially.

The guide bushing 24 and/or the recess 28 to accommodate the guide bushing 24 is/are designed so that the guide bushing 24 is accommodated in the recess 28 without any play (in the sense of a low play fit or a transitional fit) in the tangential direction T, i.e. in the direction of force (FIG. 4), while a gap 29 is provided in the radial direction R between the guide bushing 24 and the torque support 4 (FIG. 3). To this end, the guide bushing 24 may have a square design and may be arranged in a rectangular recess 28, or vice versa. Likewise an oval guide bushing 24 and a circular recess 28, or vice versa, would be conceivable. In addition there are of course a variety of other geometric shape combinations which permit a design without any play in one direction but with play in a 90° rotated direction.

Thus, the guide bushing 24 is arranged so that it is movable in the radial direction R in the recess 28, while no movement is allowed in the tangential direction T. This permits, on the one hand, a play-free introduction of force into the stationary component 5 because the reactive torque generates a tangential force on the connecting part 10. On the other hand, a compensation of tolerance in the radial direction R is nevertheless possible due to the gap 29. In addition, a movement of the torque support 4 in the direction of the longitudinal axis of the connecting pin 20 is also possible by the connecting pin 20, and this can also be utilized for a compensation of tolerance.

In addition, due to the pivotably arranged connecting pin 20, a certain angle offset between the longitudinal axis of the engine shaft 6 and/or the drive shaft 3 and the longitudinal axis of the connecting pin 20, which should be essentially parallel, can be compensated.

For fastening the guide bushing 24 on the torque support 4, a shoulder 32, that axially abuts the exterior part 23 of the spherical bearing 21, may be provided on the interior circumferential surface of the guide bushing 24. A bearing retaining part 31 is in axial contact with the opposing front side of the exterior part 23, which is attached to the guide bushing 24 by screws 35. Shoulders 33, 34, which protrude radially out of the respective exterior circumferential surface, are provided on the guide bushing 24 and on the bearing retaining part 31. Via these shoulders 33, 34, the guide bushing 24 can be clamped to the torque support 4 with the bearing retaining part 31. However, this clamping can only be so strong so that radial movement of the guide bushing 24 in the recess 28 is still possible.

A damping element 30 may also be arranged axially between the shoulders 33, 34 on the guide bushing 24 and/or on the bearing retention part 31 to reduce any possible vibration of the torque support 4. However, the damping element 30 does not affect the play-free coupling of the connecting part 10 to the stationary component 5 in the tangential direction and thus also does not affect the play-free introduction of force into the stationary component 5.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A torque support comprising:
   a first end;
   a second end; and
   a connecting part, which is provided on the second end, that includes a guide bushing arranged in a recess in the second end and a connecting pin pivotably mounted in the guide bushing,
   wherein the guide bushing is arranged so that, in a radial direction from the first end to the second end, a gap is provided between the guide bushing and an edge of the recess and so that, in a tangential direction generally normal to the radial direction, the guide bushing is arranged in a play-free arrangement in the recess,
   a spherical bearing having an exterior part and an internal part, wherein the spherical bearing is arranged in the guide bushing, and the exterior part of the spherical bearing is mounted in the guide bushing, and wherein the connecting pin is arranged on an interior part of the spherical bearing, and
   a bearing retaining part, wherein the guide bushing is clamped axially to the exterior part of the spherical bearing and to the torque support via the bearing retaining part.

2. The torque support according to claim 1, further comprising a pin retaining part, wherein the connecting pin is clamped axially to the interior part of the spherical bearing via the pin retaining part.

3. The torque support according to claim 1, further comprising a damping element arranged axially between the torque support and at least one of the bearing retaining part or the guide bushing.

4. A drive unit comprising:
   an electric motor that drives a drive part, which includes a stationary component; and
   a torque support according to claim 1,
   wherein the first end of the torque support is fastened to the electric motor, and the connecting part is arranged in the stationary component of the drive unit.

* * * * *